US010154040B2

United States Patent
Cheatham, III et al.

(10) Patent No.: US 10,154,040 B2
(45) Date of Patent: Dec. 11, 2018

(54) SYSTEMS, METHODS, AND DEVICES FOR GATHERING DISPLAY DEVICE USAGE DATA

(71) Applicant: Elwha LLC, Bellevue, WA (US)

(72) Inventors: Jesse R. Cheatham, III, Seattle, WA (US); William David Duncan, Mill Creek, WA (US); Roderick A. Hyde, Redmond, WA (US); Stephen L. Malaska, Redmond, WA (US)

(73) Assignee: Elwha LLC, Bellevue, WA (US)

( * ) Notice: Subject to any disclaimer, the term of this patent is extended or adjusted under 35 U.S.C. 154(b) by 1083 days.

(21) Appl. No.: 14/469,204

(22) Filed: Aug. 26, 2014

(65) Prior Publication Data

US 2016/0063268 A1  Mar. 3, 2016

(51) Int. Cl.
*G06Q 20/00* (2012.01)
*H04L 29/06* (2006.01)
*G06F 21/10* (2013.01)
*H04L 29/08* (2006.01)

(52) U.S. Cl.
CPC ............ *H04L 63/102* (2013.01); *G06F 21/10* (2013.01); *H04L 67/22* (2013.01)

(58) Field of Classification Search
CPC .................................................. G06Q 10/0833
USPC .......................................................... 705/50
See application file for complete search history.

(56) References Cited

U.S. PATENT DOCUMENTS

| | | | |
|---|---|---|---|
| 2001/0043063 A1* | 11/2001 | Kochi | G01R 31/3679 702/183 |
| 2002/0133416 A1* | 9/2002 | Abhyanker | G06Q 30/02 705/26.41 |
| 2005/0131757 A1 | 6/2005 | Chan et al. | |
| 2006/0023702 A1 | 2/2006 | Pulitzer | |
| 2007/0180126 A1 | 8/2007 | Merkh et al. | |
| 2008/0291261 A1 | 11/2008 | Park et al. | |
| 2009/0006694 A1 | 1/2009 | Horvitz et al. | |
| 2010/0205667 A1* | 8/2010 | Anderson | G06F 3/013 726/19 |
| 2011/0251807 A1 | 10/2011 | Rada et al. | |
| 2012/0101883 A1 | 4/2012 | Akhter et al. | |
| 2012/0150550 A1* | 6/2012 | Belady | G06Q 10/30 705/1.1 |

(Continued)

OTHER PUBLICATIONS

E2SAVE, http://www.e2save.com/mobile-phones/free-televisions, visited Aug. 27, 2014, 2 pgs.

(Continued)

*Primary Examiner* — Chinedu C Agwumezie

(57) ABSTRACT

A display device includes one or more sensors to sense activity in a physical region near the display, as well as a permission component, account component, and a data gathering component. The permission component is configured to determine a permission level corresponding to the display device. The account component is configured to determine an account status that is based on the permission level. The data gathering component is configured to gather usage data for the display device based on the permission level. The usage data includes data from the one or more sensors regarding activity in the physical region near the display device. The transmission component is configured to transmit the usage data to a remote server.

37 Claims, 5 Drawing Sheets

(56) References Cited

U.S. PATENT DOCUMENTS

| | | |
|---|---|---|
| 2013/0014137 A1* | 1/2013 | Bhatia ................. H04N 21/252 |
| | | 725/9 |
| 2013/0125212 A1 | 5/2013 | Lee |
| 2014/0157371 A1 | 6/2014 | Le Chevalier et al. |
| 2014/0162598 A1 | 6/2014 | Villa-Real |
| 2014/0228116 A1 | 8/2014 | Eck et al. |
| 2014/0245335 A1 | 8/2014 | Holden et al. |
| 2014/0323899 A1 | 10/2014 | Silberstein |
| 2015/0217196 A1 | 8/2015 | McCarthy et al. |
| 2016/0034329 A1 | 2/2016 | Larson et al. |
| 2016/0328621 A1 | 11/2016 | Negi et al. |

OTHER PUBLICATIONS

Free LCD TV Mobile Phones, http://www.freelcdtvmobilephones.co.uk/, visited Aug. 27, 2014, 1 pg.

* cited by examiner

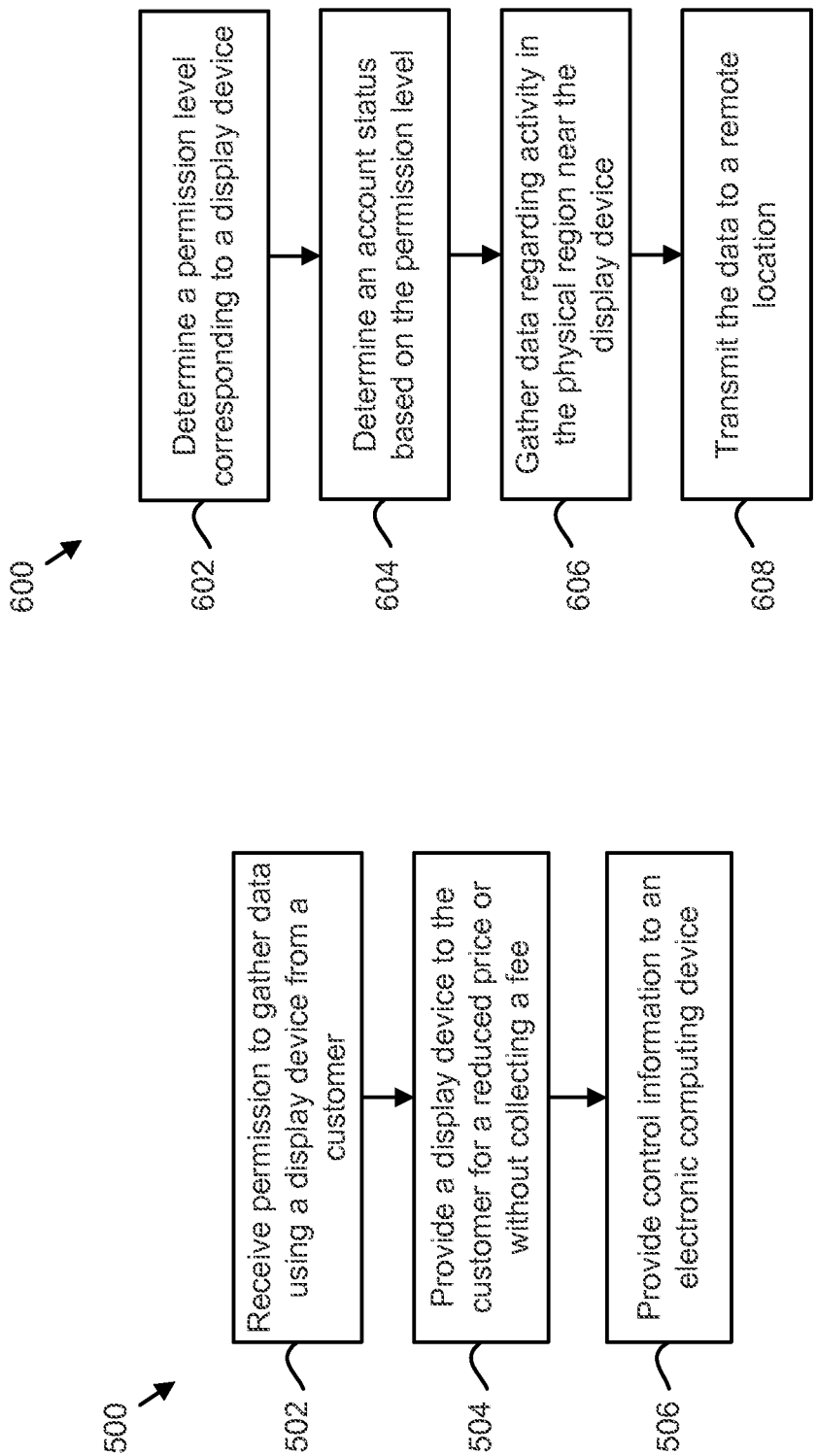

SYSTEMS, METHODS, AND DEVICES FOR GATHERING DISPLAY DEVICE USAGE DATA

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

None

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

BRIEF DESCRIPTION OF THE FIGURES

FIG. 5 is a schematic flow-chart diagram illustrating a method for providing a display device to a customer.

FIG. 6 is a schematic flow-chart diagram illustrating a method for gathering data at a display device based on a permission level.

DETAILED DESCRIPTION

Figure 1:
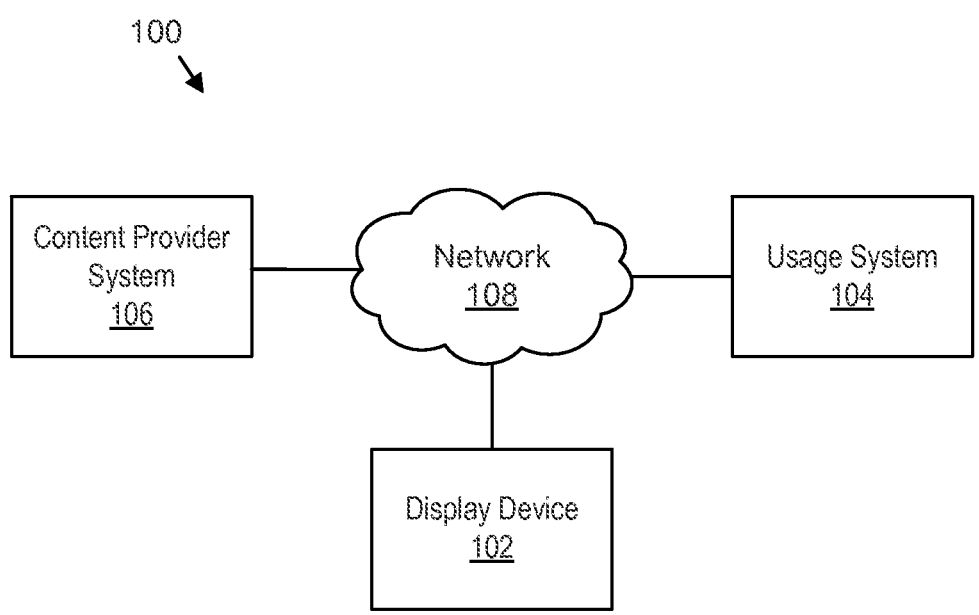
FIG. 1 is a schematic block diagram of a system for gathering data from a display device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Display screens are used on a large range of electronic devices and for a wide range of purposes. Display screens, such as televisions, monitors, or the like are often used to watch video programming, play video games, play music, browse the web, or consume other types of content. As display technology improves, display screens are able to increase in size, resolution, and frame rate, and to provide generally improved pictures and images. In some cases, new features, such as rendering three-dimensional (3D) pictures and video and high-definition, are developed and may be incorporated into newer displays. Because display technology continues to improve, and due to breakage and reaching the end of useful life, consumers can find themselves frequently purchasing displays.

Applicants have recognized a need for, and the present disclosure presents, systems, methods, and devices for providing displays to customers for a reduced cost. The reduced costs to an end user may allow users to have updated displays and thus enjoy content, picture quality, and features that would otherwise not be available to them. In one embodiment, a display device includes one or more sensors to sense activity in a physical region near the display, as well as a permission component, an account component, and a data gathering component. The permission component is configured to determine a permission level corresponding to the display device. The permission level may indicate one or more permissions for using the sensors to gather a specific amount of data and/or a type of data. The account component is configured to determine an account status that includes an amount owed for the display device, a monetary price for an available replacement display device, and/or an access level for content or services available on the display device. The account status may be based on the permission level. For example, the account status may indicate that a display device has greater access to content due to greater permissions for gathering data. This may allow users to gain access to content by allowing gathering of data by the display device instead of or in combination with monetary payment. The data gathering component is configured to gather usage data for the display device based on the permission level. The usage data may include data from the one or more sensors regarding activity in the physical region near the display device. For example, the data may capture the presence or activity of one or more viewers of the display device. The transmission component is configured to transmit the usage data to a remote server.

In one embodiment, a usage system includes a permission management component, a usage component, and an account management component. The usage system may be located at a display device or at a remote location from the display device, such as on a web server. The permission management component is configured to maintain a permission level corresponding to an account. The permission level may indicate permission for gathering a maximum amount of data and/or a type of data with respect to a display device linked with the account. The usage component is configured to receive usage data of the display device from the display device. The usage data may be received in accordance with the permission level and may include data about activity in a region near the display device. The account management component is configured to maintain an account status for the account based on the permission level. The account status may indicate an amount owed for the display device, a monetary price for an available replacement display device, and an access level for content or services available on the display device.

Turning to the figures, FIG. 1 is a schematic block diagram illustrating one embodiment of a system 100 for gathering data from a display device. In one embodiment, the system 100 may be used for providing reduced cost display hardware and/or content in exchange for gathering data. The system 100 includes a display device 102, a usage system 104, and a content provider system 106 connected via a network 108. The network 108 may include one or more communication networks such as one or more local area networks (LAN), wide area networks (WAN), cellular networks (e.g., a 3GPP network), the Internet, and the like.

The display device 102 may include a system configured to be located with an end viewer. For example, the display device 102 may be a display device or a system located with the display device which can be viewed by one or more viewers. The display device 102 may gather and forward data in accordance with a permission level or account that is associated with the display device 102. In one embodiment, the gathered data may be forwarded to the usage system 104 so that the data can be processed, stored, and/or used to determine likes, dislikes, or other information about the viewers or environment of the display device 102. In one embodiment, the usage system 104 may correspond to a provider of the display device 102. The usage system 104 may reduce a price, increase content access, or provide other benefits or functions to the viewers or display device 102 based on the gathered data and/or the permission of an account corresponding to the display device 102. The content provider system 106 may include a system corresponding to an entity or system that provides content to the display device 102. For example, the content provider system 106 may include a server that provides television, radio, web, or other content to the display device 102.

Figure 2:
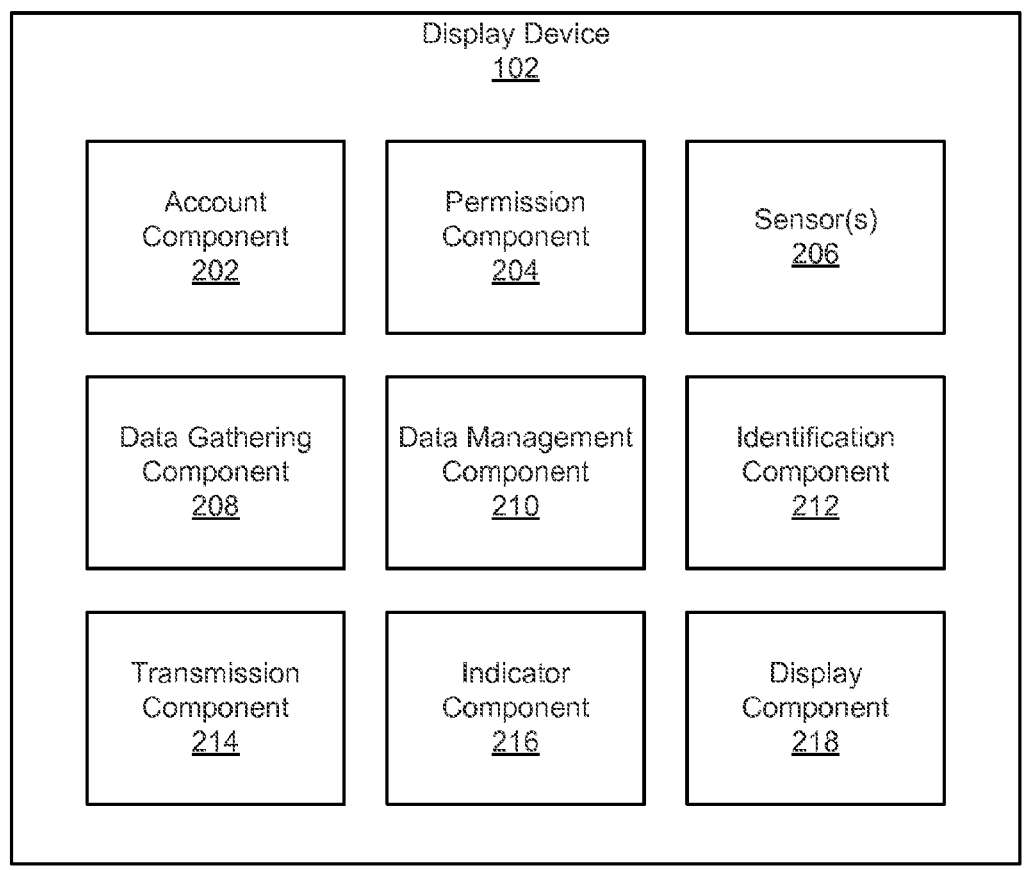
FIG. 2 is a schematic block diagram of a display device.

FIG. 2 is a schematic block diagram illustrating components of one embodiment of a display device 102. The display device 102 includes an account component 202, a permission component 204, one or more sensors 206, a data gathering component 208, a data management component 210, an identification component 212, a transmission component 214, an indicator component 216, and a display component 218. The components 202-218 are given by way of example only. All of the components 202-218 may not be included in all embodiments. In fact, some embodiments may include any one or a combination of two or more of the components 202-218. In one embodiment, one or more of the components may be located remotely, for example, as a part of the usage system 104 or content provider system 106. In one embodiment, the data management component 210, identification component 212, and/or other components may be included in the usage system 104.

In one embodiment, the account component 202 is configured to determine an account status for an account corresponding to the display device 102. The account component 202 may associate the display device 102 with a specific account, such as an account of an owner, purchaser, or renter of the display device 102. In one embodiment, the account component 202 may determine a status of an associated account. For example, the account component 202 may communicate with the usage system 104 or content provider system 106 to determine a current account status for a corresponding account. As another example, the account component 202 may access local memory of the display device 102 to retrieve an account status.

In one embodiment, the account component 202 determines an account status that includes an amount owed for a display device, such as the display device 102 or a display device to which the display device 102 is connected. For example, a business or entity may provide the display device 102 to an account owner without receiving full monetary payment for the display device 102. In one embodiment, the display device 102 is provided to the account owner without any monetary costs. The account status may track the owed monetary price of the display device 102 even if the amount is not billed. For example, the monetary price may be tracked and reduced due to monetary payments by an account holder and/or gathered data.

Similarly, the account status may include a monetary price for an available replacement display device. In some embodiments, the account status can keep track of multiple potential replacement devices, each with different monetary prices. For example, a 60 inch high definition display device can be available for replacement at a higher price than a 32 inch low definition display device. For example, the replacement display device may include a device that may be obtained by an account owner if the account owner pays the monetary price. In one embodiment, the monetary price indicates a price for exchanging a current display device or display device 102 for the replacement display device. In one embodiment, in the event that the monetary price for an available replacement display device has been reduced to zero or below, the user can be supplied with the available replacement display device for free. In some embodiments, the user may periodically be provided with replacement display devices (e.g., once a year) in exchange for permitting an appropriate amount of data to be gathered and transmitted over the time period between replacements.

In one embodiment, the account status may include an access level for content, features, or services available on the display device. For example, the access level may indicate what programming can be accessed by the display device 102. The programming may include television channels, websites, streaming video services, radio channels, and/or any other type of content that may be displayed by a display or rendered on an audio output device. In one embodiment, the access level may indicate content that is available for free access on the display device 102. In one embodiment, the access level may indicate content that is available for an additional fee or for an increased permission level. In one embodiment, the access level may indicate that content from a provider of the display device 102 is available but that content from other providers is not available. For example, the access level may indicate non-authorized content providers and authorized content providers. The non-authorized content providers may only be accessible for an additional fee or for a specific permission level. In one embodiment, a feature (such as displaying 3D images or movies, video chats, or the like) may be allowed or blocked based on the access level.

In one embodiment, the account status includes information about how much data needs to be collected in order to obtain a specific replacement display device. For example, a plurality of different replacement display devices may be listed with different amounts/types of data that need to be collected. Once a specific amount and/or type of data is collected, the account owner may be able to obtain or exchange for the new device. In one embodiment, the account status indicates a ratio for an amount of content to amount of usage data to be gathered. For example, the ratio may indicate that one unit of time of content can be consumed in exchange for one unit of time of gathered data (e.g., a ratio of 1 to 1). Other ratios are also possible and the ratio may be addressed to encourage the user to allow the gathering of data and/or allow the gathering of certain types of data. In one embodiment, the account status indicates that access to content from the other content providers (non-authorized content) is more expensive than content from the provider of the display device (authorized content). In one embodiment, the access level of the account stats may indicate content from only providers authorized by a provider of the display device is allowed.

The permission component 204 determines a permission level corresponding to the display device 102. For example, the permission level may correspond to an account associated with the display device 102. In one embodiment, the permission component 204 determines the permission level by retrieving the permission level from storage local to the display device 102 or querying the usage system 104 or content provider system 106. In one embodiment, the permission level is based on a contract signed by an account holder or another indication from the account holder that grants the specific permission of the permission level. In one embodiment, the permission level is based on the account status. For example, a lower amount owed on the display device 102 or a greater access level to content may correspond to a permission level that allows the gathering of more data.

In one embodiment, the permission level indicates permissions for gathering data from the display device 102. For example, the permission level indicates permission to a provider of the display device 102 or an entity owning or operating the usage system 104 or content provider system 106 to gather data from the display system. In one embodiment, the permission level may indicate permissions for gathering data using the one or more sensors 206 of the display device 102. The permissions may indicate an amount of data that can be gathered. For example, the permission for an amount of data may include an amount of data measured in memory size, measured by time, or measured by any other measurement.

In one embodiment, the permissions indicate a number of hours of data to be gathered during a time interval. For example, the permissions may allow for a specific number of hours to be gathered per month. As another embodiment, the permission may indicate a cumulative number of hours that may be gathered, after which no more data may be gathered for a life of the display device 102. The permission level may indicate time periods during which data may or may not be gathered. In one embodiment, the permission level indicates a time of day during which the data may be collected, such as during work-day hours, during prime time, or at any other time. In one embodiment, the permission level indicates that the data may only be collected during usage of the display device 102 or other display device.

The permissions may indicate a type of data that can be gathered. For example, the type of data may include video, audio, radar, infrared, 3D, wireless signals, or other types of data. In one embodiment, the permission level may indicate that gathering a specific type of data is authorized while gathering another type of data is not authorized. For example, the permission level may indicate that radar data may be gathered but video data gathering is blocked.

In one embodiment, the permission level may correspond to a specific permission tier. For example, a number of permission tiers may be available and the permission level may correspond to one of the permission tiers to allow. Each permission tier may have corresponding permissions for data gathering. In one embodiment, a higher-level tier (i.e., higher or greater permission level) may correspond to greater permissions for data gathering while a lower tier (i.e., lower permission level) may have reduced or no permissions for data gathering.

In one embodiment, the permission component 204 may receive or obtain a change to the permission level. In one embodiment, the change to the permission level may be based on one or more of a change to an account status or input from an account owner or other user. For example, the permission component 204 may obtain an indication that the permission level has been reduced based on receipt of a payment decreasing the monetary amount for the amount owed for the display device 102. As another example, the permission component 204 may receive input from a user changing the permission level to increase or decrease the amount of data or type of data that can be gathered.

In one embodiment, the account status may be based on the permission level for the account. For example, the permission level may, at least in part, determine the account status. In one embodiment, increases to the permissions granted by an owner for gathering data may result in a reduced monetary amount owed on the display device, reduce a cost for a replacement display device, and/or increase access levels to content. In one embodiment, a specific permission level may correspond to one or more specific account statuses. In one embodiment, a user, such as an account owner, may be able to increase the permission level to save money and/or increase content and feature access. For example, the permission level may determine which channels, shows, features, etc. are accessible or functional on display device 102.

In one embodiment, the account status may indicate a monetary amount corresponding to one or more of the amount owed for the display device 102 and the monetary price for the available replacement display device. In one embodiment, when the permission level is increased, the account component 202 receives an indication that the monetary price has been reduced based on the permission level. This change may be indicated to the user through an on-screen message, a message in an account, or any other messaging system to convey changes to the account to an account owner.

In one embodiment, the account status indicates a monetary amount corresponding to the amount owed for the display device 102, such as the display device 102 or a display device connected to the display device 102. In one embodiment, account component 202 determines that the access level for content or services available on the display device 102 are reduced or increased in response to the permission level change. In one embodiment, the account component 202 determines that the amount owed for the display device 102 is reduced or increased in response to the permission level change. In one embodiment, the account component 202 determines that the monetary price for the available replacement display device is reduced or increased in response to the permission level change. In one embodiment, the account component 202 provides an indication on the display device 102 of the updated account status. For example, the display device 102 may provide a menu or account interface where information is displayed about the current account status and/or any changes to the account status.

In one embodiment, the display device 102 may include one or more sensors 206 for sensing activity in a physical region near the display device 102. The sensors 206 may include any type of visual, audio, range finding, or other sensors. For example, the display device 102 may include a camera such as a still image camera, a video camera, an infrared camera, or other camera for capturing visual and/or infrared images of a physical region near the display device 102. In one embodiment, the sensors 206 are positioned or oriented to sense activity or gather data in a region where individuals can view a display screen of the display device 102 or a display screen connected to the display device 102. In one embodiment, the sensors 206 include a 3D camera or other 3D sensor for capturing 3D images. For example, the 3D camera may include two or more camera lenses having offset positions in relation to each other. The cameras may then be used to get a 3D image or view of a region near the display device 102.

In one embodiment, the sensors 206 include an audio sensor, such as a microphone, to capture audio data near the display device 102. The microphone may capture audio from a display device and/or from viewers of the display device. For example, audible reactions or comments of one or more viewers may be captured by the microphone. In one embodiment, the sensors 206 include a range finding sensor or other sensor to determine distances or 3D spacing or locations of objects. In one embodiment, the sensors 206 include a radar unit or light detection and ranging (LIDAR) unit for determining a 3D shape of a viewing area and/or individuals within the viewing area.

In one embodiment, the sensors 206 may include an antenna to detect wireless signals in the region near the display device 102. For example, the antenna may be used to determine a radio environment near the display system and/or identify types of devices or protocols that are being used to communicate by devices or systems near the display device 102. In one embodiment, the sensors 206 may include a global positioning system (GPS) module that detects a location of the display device 102.

The data gathering component 208 gathers data in accordance with a permission level for the display device 102. For example, the data gathering component 208 may gather data based on the permission level determined by the permission component 204. The data gathering component 208 may activate and gather data from the one or more sensors 206 regarding activity in the physical region near the display device 102. For example, the data gathering component 208 may gather one or more of images, video, infrared images, 3D images, radar data, LIDAR data, audio data, location data, or any other data about a region near the display device 102. Similarly, the data gathering component 208 may detect wireless signals present at the display device 102. For example, the data gathering component 208 may detect wireless signals including signals corresponding to one or more of a wireless router, a wireless phone, a cellular phone, a computing device, a broadcast signal, and the like.

In one embodiment, the data gathering component 208 gathers usage data regarding how the display device 102 is used. For example, the data gathering component 208 may gather data about content or programming displayed on the display device 102. Data about the content or programming may include information about a title, rating, genre, actor, or other information. Additionally, data about advertisements or other related content may also be gathered. In one embodiment, the data gathering component 208 gathers data about devices connected, via a cable or wireless port, to the display device 102 (e.g., digital video disc (DVD) players, gaming consoles, computing devices, or any other connected device). The data about connected devices may include information about a manufacturer, device type, software programs or versions loaded onto or running on the devices, or other information about the connected device. The data gathering component 208 may store the gathered data in memory for later access, processing, or transmission.

The data gathering component 208 gathers data based on the permission level for the account corresponding to the display device 102. For example, the data gathering component 208 may gather types of data at times or in amounts indicated by the permission level. The data gathering component 208 may activate or deactivate the sensors 206 as required by the permission level to ensure that data is only gathered as approved by the permissions of the account. The data gathering component 208 may also determine whether a sensor 206 is blocked or not functioning. For example, if the data gathering component 208 is not able to gather data in accordance with a permission level, the data gathering component 208 may block usage of the display device 102 to consume content. In one embodiment, the display device 102 is rendered inoperable to display or render content if the sensors are blocked, disabled, incorrectly positioned, or the like. In one embodiment, the display device 102 may disable certain features of the display device 102 if sensor data cannot be collected. Example, features to disable include a display screen, a speaker, 3D rendering, video/audio output ports, or the like. In one embodiment, the account component 202 may modify an account status (e.g., increase an amount owed for display device 102, increase the monetary price for an available replacement device, etc.) if sensor data cannot be collected.

Figure 3:
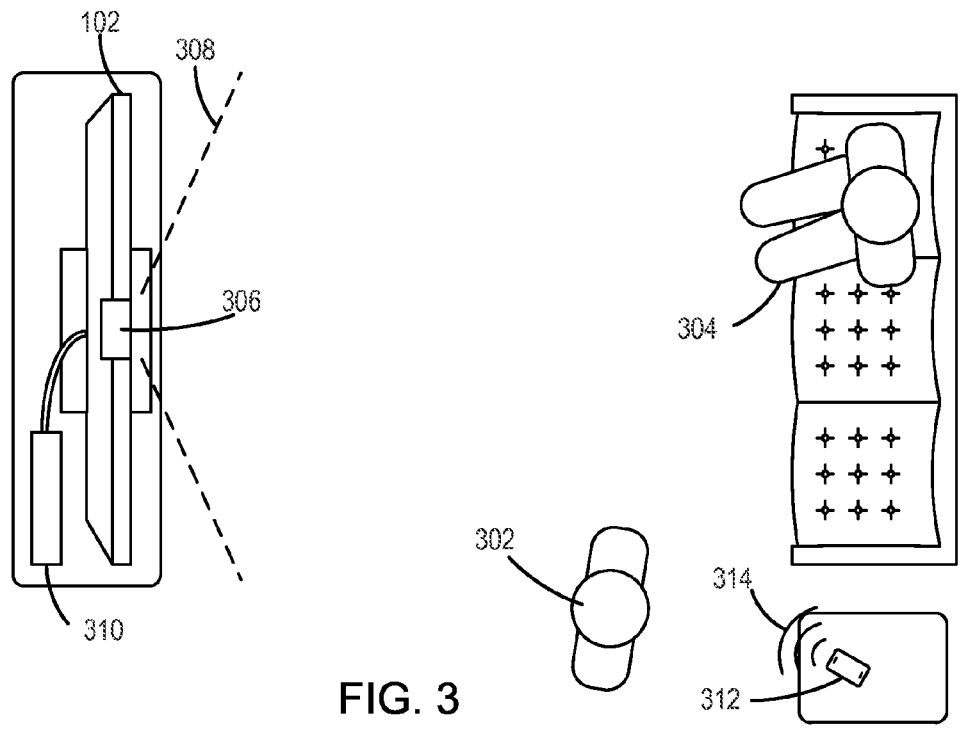
FIG. 3 is a schematic diagram illustrating a top view of a physical region near a display device.

FIG. 3 is a schematic diagram illustrating a top view of a physical region near a display device 102. In the depicted embodiment, the display device 102 includes a television. The television is situated for viewing by viewers 302 and 304. The display device 102 includes a sensor unit 306 for observing a physical region (such as the viewing area 308 indicated by dotted lines) near the display device 102. The display device 102 is connected to an input source 310. A wireless device 312 is located nearby emitting wireless signals 314.

In one embodiment, sensor unit 306 houses one or more sensors 206 to observe viewing area 308. The data gathering component 208 may gather data about individuals and objects in the viewing area 308 by activating and receiving data from one or more sensors of the sensor unit 306. As discussed above, the data gathering component 208 may also gather data about the connected input source 310. Additionally, the data gathering component 208 may detect the wireless signals 314 or other radio signals in the radio environment of the display device 102.

Returning to FIG. 2, the data management component 210 conditions gathered data for storage, transmission, or reporting of the data. In one embodiment, the data management component 210 conditions the data by removing potentially identifying information. For example, in one embodiment, the data management component 210 anonymizes the gathered data by removing identifying information gathered by the sensors. The identifying information removed may include metadata, faces within image data, images of nearby documents, or other information that might link the gathered data to the account owner, viewers, or the like, for privacy reasons. In some embodiments, the data management component 210 removes data in accordance with a current permission level for the display device 102. For example, some permission levels may require the removal of identifying information while other permission levels may allow the identifying information to remain in the gathered data.

The identification component 212 is configured to detect one or more human users viewing a display of the display device 102. The identification component 212 may receive sensor data gathered by the one or more sensors 206 and detect the presence of humans in a viewing area based on the sensor data. In one embodiment, the identification component 212 may detect a human using visual images, using techniques such as image recognition, object recognition, face detection, or the like. In one embodiment, the identification component 212 may detect a human using audio data such as microphone data to detect a human voice, breathing, or the like. In one embodiment, the identification component 212 may detect a human using infrared images to identify a heat signature of a person.

In one embodiment, the identification component 212 may detect a human based on the detection or recognition of a 3D object. For example, a 3D camera, LIDAR unit, radar unit, or the like may be able to detect a 3D shape or signature of a human to detect that a human is present. In another embodiment, the identification component 212 may detect a human based on a detected motion using a motion sensor, a radar unit, 3D camera, LIDAR unit, camera, or the like. In yet another embodiment, the identification component 212 may detect a human based on a heat signature, such as a heat signature detected by an infrared camera. The identification component 212 may also detect the presence of objects or animals within view/range of the sensors 206. For example, the identification component 212 may identify specific types of objects or animals which may be used for advertising purposes for the viewing location. In one embodiment, the identification component 212 determines how many people are currently watching a display, or at least are detectable or viewable by the sensors 206.

The identification component 212 may also be configured to identify specific humans. For example, the identification component 212 may determine a unique identity for a specific individual. In one embodiment, the identification component 212 stores or retrieves one or more identities with identifying features that may be used to identify human viewers. For example, the identifying features may include any physical aspect of the users such as facial features or dimensions for face recognition or other dimensions or physical aspects of a body of a viewer. In one embodiment, voice recognition or other audio information regarding a human can be used to identify the human. In yet another embodiment, wireless signals may be associated with a specific individual. For example, a signal from a cell phone or other wireless communication device may be detected and used to determine that a specific individual is present.

In one embodiment, the identification component 212 associates information with an identity. For example, the identification component 212 may associate an account with the identity of a user or may associate a permission level with the identity. For example, the account may be associated with a specific identity as an account owner for the account. Similarly, the identification component 212 may associate an identity with content viewed by the corresponding individual. For example, the identification component 212 may associate the identity with content displayed by the display device 102 while the individual is present. In one embodiment, a portion of sensor data and/or usage data for the display device 102 may be associated with each specific identity of viewers present for the gathered sensor and usage data. In one embodiment, the term usage data is given to mean data about how a display device 102 (or corresponding display) is used, including sensor data. For example, usage data may include what content is displayed, what connected devices are used, what features of the display are used, how many viewers are present, or the like. In one embodiment, the identification component 212 stores identities and associated data locally with the display device 102 or at another location, such as at the usage system 104.

In one embodiment, the identification component 212 determines whether a specific identity corresponds to a restricted identity. For example, the restricted identity may correspond to a specific identity selected by an account holder. In one embodiment, the identification component 212 limits an amount or type of data associated with the restricted identity. For example, no data may be associated with the restricted identity to maintain privacy for the corresponding individual. In one embodiment, the identification component 212 permits storage or transmission of data associated with restricted identities only if this data is aggregated with data from multiple identities.

Returning to FIG. 3, the identification component 212 may detect the presence of the viewers 302 and 304 because they are within the viewing area 308. In one embodiment, the identification component 212 may identify the viewers 302, 304 based on face recognition or any other recognition technique, such as those discussed above. Content displayed on the display device 102 is also associated with the identities and stored for analysis or later targeted content or advertising. In one embodiment, the identification component 212 may also detect other objects near the display device 102, such as furniture, pets, decorations, or other objects.

Returning to FIG. 2, the transmission component 214 transmits data gathered by the display device 102 to a remote location, such as the usage system 104 or content provider 106. The transmission component 214 may include a wired or wireless network interface card (NIC) for transmitting and receiving information using an electronic communication standard. In one embodiment, the transmission component 214 transmits data gathered by the data gathering component 208. The data transmitted to remote systems may be in accordance with a permission level determined by the permission component 204. In one embodiment, the transmission component 214 transmits the data after it has been modified or redacted by the data management component 210. Furthermore, the transmission component 214 may transmit data regarding detected or identified individuals or objects, as determined by the identification component 212. In one embodiment, the transmission component 214 may transmit data associated with an identity so that ongoing usage and/or content viewed by a specific individual can be tracked. The transmission component 214 may transmit the data on a periodic basis, such as monthly, weekly, daily, hourly, or the like. In one embodiment, the transmission component 214 transmits the data as it is received from other components of the display device 102, as appropriate.

In one embodiment, the transmission component 214 securely transmits data to only trusted entities. For example, the transmission component 214 may store an identifier or uniform resource locator (URL) corresponding to a specific entity to which information should be transmitted. Passwords, encryption, or other features may be used to determine that the receiving entity is the correct entity or that transmitted data cannot be read by unauthorized parties.

The transmission component 214 may also determine whether the data can be transmitted to a trusted entity. For example, the transmission component 214 may determine whether an Internet connection is available or if a remote server is available. In one embodiment, if the transmission component 214 is not able to transmit data in accordance with a permission level, the transmission component 214 may block usage of the display device 102 to consume content. In one embodiment, the display device 102 is rendered inoperable to display or render content if there is no Internet connection or the trusted server or entity is not available. In one embodiment, the display device 102 may disable certain features of the display device 102 if the data cannot be transmitted. Example, features to disable include a display screen, a speaker, 3D rendering, video/audio output ports, or the like.

The indicator component 216 is configured to indicate that data is currently being gathered. In one embodiment, the indicator component 216 determines whether data is being gathered and provides an indication that data is currently being gathered by the data gathering component 208. For example, the indicator component 216 may provide an on-screen indication on a display screen that sensor data or other usage data is currently being gathered by the data gathering component 208. As another example, the indicator component 216 may include a separate indicator light, such as a light-emitting diode (LED), which the indicator turns on when the data is being gathered. Thus, the indicator component 216 may indicate to one or more individuals in a viewing area of the display device that the data gathering component 208 is currently gathering data about activity in the physical region near the display device 102.

In one embodiment, the indicator component 216 also indicates that changes to an account or permission level have occurred. For example, a message may be displayed on a display indicating that a permission level has been changed, or that an account status has changed. A viewer or account owner may thereby know that some changes have been made. For example, an account owner may determine that requested changes have taken place or that unrequested changes have occurred. If the owner did not request the changes, the owner may follow up to determine why they have changed and/or correct the account status or permission level.

The display component 218 is configured to display content on a display screen. The display component 218 may include a video card, display (such as a display screen or projector), and/or a video port for attaching to a separate display screen. In one embodiment, the display component 218 receives input from a user to select content for display by the display device 102. In one embodiment, the display component 218 displays content in accordance with an account status as determined by the account component 202. For example, the display component 218 may block display of unauthorized content or features while allowing access to content or features authorized by the account status.

The display device 102 may be implemented in a variety of physical formats, depending on a variety of embodiments. In one embodiment, the display device 102 may include a housing that houses one or more, or all, of the components 202-218 in a single device. For example, the display device 102 may include a "smart television" with built-in display, ports, and components 202-218. In one embodiment, one or more of the components 202-218 may be housed in separate housings or physical devices. For example, the display device 102 may include a port for connecting to a separate display screen or projection element. The display device 102 may be embodied as one or more of a television, a computer monitor, a video projection system, a phone, a tablet computer, a laptop, a desktop computer, and a portable digital assistant (PDA).

Figure 4:
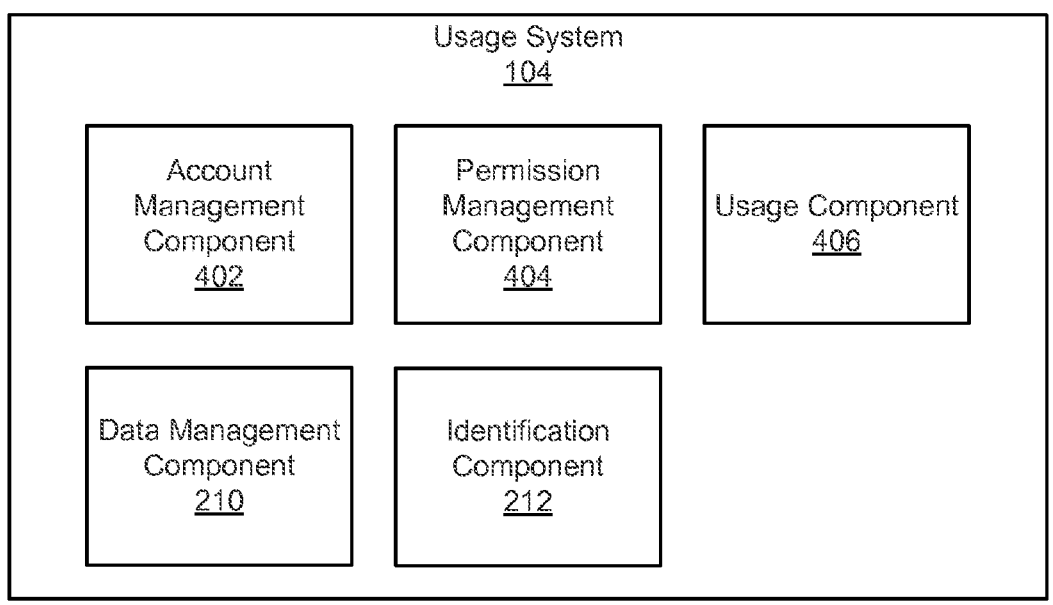
FIG. 4 is a schematic block diagram of a usage system.

FIG. 4 is a schematic block diagram illustrating components of one embodiment of a usage system 104. The usage system 104 includes an account management component 402, a permission management component 404, a usage component 406, a data management component 210 and an identification component 212. The components 402-406 and 210-212 are given by way of example only. All of the components 402-406 and 210-212 may not be included in all embodiments. In fact, some embodiments may include any one or a combination of two or more of the components 402-406 and 210-212.

The account management component 402 manages one or more accounts for one or more display devices 102. In one embodiment, the account management component 402 maintains an account status for each account. For example, the account management component 402 may maintain a database with entries for account statuses for each of a plurality of accounts. As discussed above, an account status may include one or more of an amount owed for a display device (such as display device 102 of FIG. 2), a monetary price for an available replacement display device, and an access level for content or services available on the display device. In one embodiment, the account management component 402 determines what an account status for a specific account should be and stores the account status for later usage or for access by a corresponding display device 102. For example, an account component 202 may access the usage system 104 to determine a current account status.

In one embodiment, the account management component 402 determines the account status based on a permission level to gather data for the corresponding account. For example, higher permission levels may correspond to an account status that is more favorable (e.g., more access, more features, and/or less cost) to an account owner while lower permission levels correspond to an account status that is less favorable. In one embodiment, the account management component 402 detects a change to a permission level and changes the account status based on a change to the permission level. For example, an access level for content or services available on the display device 102 may be reduced or increased when the permission level is changed. Similarly, the cost for a replacement device or an amount owed on the display device 102 may be reduced or increased when the permission level is changed and/or if the permission level has been at least at a specific permission level for a required length of time.

In one embodiment, the account management component 402 determines the account status based an amount of data gathered from a display device 102. For example, as more data is gathered, the account status may be adjusted to reward an account owner or viewer. In one embodiment, the account management component 402 determines the account status based on input, payment, or other action by a user. For example, an account owner may be able to select a modification to the account status by selecting an option to have access to a specific type of content or obtain a new display device 102. In one embodiment, the user can select the option to gain access to content and corresponding changes may be made to the permission level for the account to compensate for the change. In one embodiment, the change to the account status by the user may include a modification of a permission level, a monetary payment, a change to an access level, or the like.

In one embodiment, the account management component 402 changes the account status by reducing a price for a replacement device or system and/or reducing an amount owed on a display device 102. For example, the account management component 402 reduces the price for a replacement or amount owed to zero when a high enough permission level is set, when a specific amount of data has been gathered, and/or if a full price has been paid. In one embodiment, the account management component 402 changes the account status by modifying a ratio of an amount of time available to access content or services to an amount of usage data that needs to be gathered. For example, the ratio may be increased or decreased to require more or less data per unit time of content displayed on the display device 102. In one embodiment, the account management component 402 may modify a cost to access content. In one embodiment, the account management component 402 changes the account status by modifying a content access level to allow access to content providers not associated with a provider of the display device 102.

The permission management component 404 maintains a permission level for one or more accounts for one or more display devices 102. For example, the permission management component 404 may manage a permission level for each of the accounts managed by the account management component 402. As discussed above, the permission level may indicate permissions for gathering one or more of an amount of data and a type of data with respect to a display device 102 linked with the account.

In one embodiment, the permission management component 404 determines or updates the permission level for the account. In one embodiment, the permission management component 404 determines the permission level based on an amount paid by a user. In one embodiment, the amount owed on a display device discussed above may, at least initially, correspond to a cost of the display device minus the amount paid by the user. For example, the amount paid may correspond to a price paid for a display device (such as the display device 102), content access, or the like. In one embodiment, the amount paid may indicate that no fee was paid. For example, the permission management component 404 may determine that an account has a higher permission level (i.e., greater permission to gather data) if a lower amount was paid for the display device or system. Similarly, the permission management component 404 may determine a permission level based on an amount paid for access to content.

In one embodiment, the permission management component 404 determines the permission level based on an agreement accepted by an account owner or viewer of a display device 102. For example, an owner may receive a display device 102 for a reduced price (or for free) in return for agreeing to allow data to be gathered using the display device 102. Similarly, a viewer or owner may select an option when using the display device 102 to allow gathering of data based on a permission level. In one embodiment, the account owner or a viewer may select an option to obtain access to content in return for an increase in the permission level.

In one embodiment, the permission management component 404 determines the permission level based on an amount of data gathered by a display device 102. For example, after a specified amount of data has been gathered the permission management component 404 may reduce the permission level to reduce or stop the gathering of data.

The usage component 406 is configured to obtain usage data and/or sensor data from one or more display devices 102. For example, the usage component 406 may receive data gathered, generated, and/or transmitted by the display device 102. The received data may include data about activity in a region near the display device 102. The received data may include any of the data discussed above in relation to the display device 102 such as camera images, video, 3D images, infrared data, audio data, radar data, LIDAR data, location data, or the like. Similarly, the received data may include data about content displayed on the display device 102, input sources connected to the display device 102 (e.g., via a wired or wireless connection), software used on connected devices, or other information about input sources or displayed content. In one embodiment, the received data includes data about a radio environment of the display device 102, such as information about wireless signals corresponding to one or more of a wireless router, a wireless phone, a cellular phone, a computing device, broadcast signals, and/or the like. In one embodiment, the usage component 406 may receive information about a number of viewers, viewer identities, or any other information determined by the identification component 212 or other components of the display device 102. In one embodiment, the data may include data that has been modified to remove identifying information or other privacy sensitive information from the data gathered by the data management component 210. The usage component 406 may receive and store the data from the display device 102 for processing.

In one embodiment, the usage system 104 may include a data management component 210 and an identification component 212. For example, the functionality of the data management component 210 and/or the identification component 212 may be located with the usage system 104 as well as or instead of at the display device 102. For example, the data management component 210 may modify data received from the display device 102 to remove identifying information or increase privacy of those located near the display device 102. In one embodiment, a data management component 210 located on the usage system 104 may also aggregate data from multiple display devices 102 with data from one or more other accounts to reduce the likelihood that the information can be tracked back to a specific display device 102 or account.

In one embodiment, the data obtained or generated by the usage system 104 may be stored for usage by a corresponding entity or content providers. For example, the data may be used to study how people consume content and/or determine more accurate numbers regarding how many people watch specific programming. Viewing environments, watching habits, and the like may be determined from the data. Similarly, other data about locations, such as radio environments, locations of display devices 102, or the like, may be obtained. In one embodiment, the information received by the usage component 406 may allow for entities to determine target content or advertisements for a specific household or determine how much to charge for an advertisement based on how many people are present.

FIG. 5 is a schematic flow-chart diagram illustrating a method 500 for providing a display device 102 to an end user or account owner. In one embodiment, the method 500 is performed by a system owned or operated by a provider of the display device 102 or a content provider, such as the usage system 104 of FIG. 4.

The method 500 begins and the usage system 104 receives 502 permission to gather data using a display device. For example, the usage system 104 may receive 502 the permission in response to a selection or entry made by a customer on a website. In one embodiment, the usage system 104 receives 502 permission in response to the customer signing a contract or otherwise indicating that the customer will allow for data gathering using the display device. For example, a customer may sign a contract by writing on a piece of paper, entering information electronically into a computer, verbally agreeing to the contract via phone or in person, or the like. In one embodiment, an employee of a provider of the display device may enter data readable by the usage system 104 in response to a verbal or other indication of agreement to allow data gathering.

The usage system 104 may provide 504 a display device to a customer for a reduced price or without collecting a fee from the customer. For example, the usage system 104 may initiate an order for a display device to be shipped to the customer.

The display device may have one or more sensors or components as indicated in the display device 102 of FIG. 2. In one embodiment, the usage system 104 provides 504 a display device 102 to the customer without cost or with a reduced cost.

The usage system 104 collects 506 data from the display device in accordance with the permission received 502 by the usage system 104. For example, the display device may include a display device 102 that gathers and transmits data to the usage system 104. In one embodiment, the usage system 104 may reduce a tracked monetary amount for the display device 102 in representation that the display device is being paid for by data gathering instead of or in conjunction with monetary payment. In one embodiment, the usage system 104 may collect 506 a specific amount of data to reduce the price or cost of the display device 102 to zero. In one embodiment, data beyond the specific amount may be used to reduce a cost of a replacement display device or reduce a cost to access content.

FIG. 6 is a schematic flow-chart diagram illustrating a method 600 for gathering data at a display device based on a permission level. In one embodiment, the method 600 may be performed by a display device, such as the display device 102 of FIG. 2.

The method 600 begins and a permission component 204 determines 602 a permission level corresponding to a display device. In one embodiment, the permission level indicates permissions to gather a specific amount of data and/or a specific type of data using sensors of the display device. The permission component 204 may determine 602 the permission level by accessing a record of permissions stored locally to the display device or may access a remote server (such as a usage system 104) to obtain a current permission level for the display device. In one embodiment, the permission level may correspond to an account linked with the display device.

An account component 202 determines 604 an account status for an account corresponding to the display device. The account status may indicate one or more of an amount owed for the display device, a monetary price for an available replacement display device, and an access level for content or services available on the display device. In one embodiment, the account status is based on the permission level. For example, a higher permission level may lead to a more favorable account status for a viewer or account holder of the display device.

A data gathering component 208 gathers 606 data for the display device based on the permission level. For example, only data or time periods allowed by the permission level may be used to gather 606 data. In one embodiment, the data gathered 600 includes data from one or more sensors of the display device regarding activity in the physical region near the display device. For example, the sensors may observe a physical area near the display device, such as a viewing region for the display device, to observe how viewers consume content on the display device. A transmission component 214 transmits 608 the data to a remote server. In one embodiment, the transmission component 214 is configured to securely transmit 608 the data only to authorized devices or systems. For example, the transmission component 214 may authenticate a target server before the data is transmitted 608. In one embodiment, the transmission component 214 may transmit the data as it is gathered 606 by the data gathering component 208, or on a periodic (e.g., monthly, weekly, daily, hourly, etc.) basis.

Figure 7:
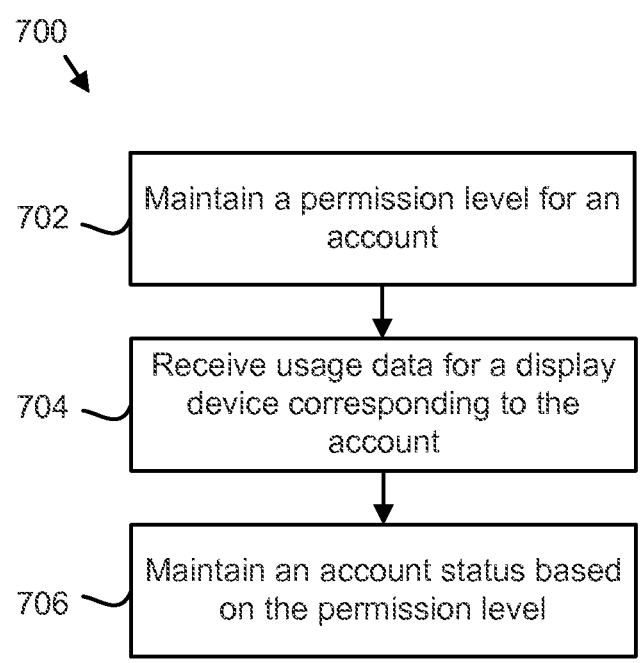
FIG. 7 is a schematic flow-chart diagram illustrating a method for gathering data from a display device.

FIG. 7 is a schematic flow-chart diagram illustrating a method 700 for gathering data from a display device. In one embodiment, the method 700 may be performed by a system operated by a provider of the display device, such as the usage system 104 of FIG. 4.

The method 700 begins and a permission management component 404 maintains 702 a permission level corresponding to an account. In one embodiment, the permission management component 404 maintains 702 permission levels for a plurality of accounts. For example, a large number of display devices with associated accounts may have corresponding permission levels which are maintained 702 by the permission management component 404. In one embodiment, the permission levels indicate permission for gathering a specific amount of data and/or a type of data with respect to a display device linked with the account. For example, the permissions may indicate what types/amounts of data an account owner has agreed to allow a provider of a display device to gather.

A usage component 406 receives 704 usage data of the display device from the display device. The usage component 406 receives 704 usage data that complies with the permission level maintained 702 by the permission management component 404. The usage data may include data about activity in a region near the display device, data about content displayed on the display device, input devices connected to the display device, or any other data about how the display device is used or an environment of the display device.

An account management component 402 maintains 706 an account status for the account based on the permission level. The account status maintained 706 by the account management component 402 may include one or more of an amount owed for the display device, a monetary price for an available replacement display device, an access level for content or services available on the display device, and the like. In one embodiment, the account management component 402 maintains 706 the account status by updating the account status in response to a change to the permission level. For example, if the permission level is increased to allow for an increase in gathered data, the account management component 402 may modify the account status to be more favorable to an account owner. Examples of how an account status may be made more favorable include reducing an amount owed on a display device, reducing a cost for a replacement display device, increasing an access level to content and features on the display device, and/or reducing a cost to access content or features on the display device.

This disclosure has been made with reference to various example embodiments. However, those skilled in the art will recognize that changes and modifications may be made to the embodiments without departing from the scope of the present disclosure. For example, various operational steps, as well as components for carrying out operational steps, may be implemented in alternate ways depending upon the particular application or in consideration of any number of cost functions associated with the operation of the system; e.g., one or more of the steps may be deleted, modified, or combined with other steps.

Additionally, as will be appreciated by one of ordinary skill in the art, principles or components of the present disclosure may be reflected in a computer program product on a computer-readable storage medium having computer-readable program code means embodied in the storage medium. Any tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create a means for implementing the functions specified. These computer program instructions may also be stored in a computer-readable memory that can direct a computer or other programmable data processing apparatus to function in a particular manner, such that the instructions stored in the computer-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A display device comprising:
   one or more sensors to sense activity in a physical region near the display device and generate usage data for the display device;
   a permission component configured to determine a permission level, wherein the permission level indicates an amount of time that the one or more sensors are authorized to generate usage data within a time interval;
   an account component configured to determine an account status comprising one or more of an amount owed for the display device, a monetary price for an available replacement display device, or an access level for content or services available on the display device, wherein the account component determines the account status based on the permission level, such that when the permission component determines a higher permission level authorizing a greater amount of time for the one or more sensors to generate usage data, the account component determines an account status comprising a lower amount owed for the display device, a lower monetary price for an available replacement display device, or an increased access level for content or services available on the display device, respectively;
   a data gathering component configured to gather usage data for the display device by activating or deactivating the one or more sensors based on the permission level; and
   a transmission component configured to transmit the usage data to a remote server.

2. The display device of claim 1, wherein the permission level further indicates a time of day during which usage data may be collected.

3. The display device of claim 1, wherein the one or more sensors comprise a camera and wherein the data gathering component gathers camera images of the physical region near the display device.

4. The display device of claim 3, wherein the camera comprises a three-dimensional camera and wherein the camera images comprise three-dimensional images.

5. The display device of claim 3, wherein the camera comprises an infrared camera and wherein the camera images comprise infrared images.

6. The display device of claim 1, wherein the data gathering component disables one or more features of the display device if at least one sensor is blocked, disabled, or incorrectly positioned.

7. The display device of claim 1, wherein the data gathering component gathers usage data comprising information about content displayed on the display device.

8. The display device of claim 1, wherein the data gathering component gathers usage data comprising information about what devices are connected to the display device via a physical or wireless connection.

9. The display device of claim 1, wherein the data gathering component is configured to detect wireless signals present at the display device.

10. The display device of claim 9, wherein the data gathering component detects the wireless signals comprising signals corresponding to one or more of a wireless router, a wireless phone, a cellular phone, a computing device, and a radio signal.

11. The display device of claim 1, wherein the display device comprises one or more of a television, a computer monitor, a phone, a tablet, a laptop, a desktop, and a portable digital assistant (PDA).

12. A method comprising:
   determining, via a permission component, a permission level corresponding to a display device, wherein the permission level indicates an amount of time that one or more sensors are authorized to monitor activity in a physical region near the display device and generate usage data for the display device;

determining, via an account status component, an account status for the display device, the account status comprising one or more of an amount owed for the display device, a monetary price for an available replacement display device, or an access level for content or services available on the display device, wherein, in response to the permission component determining a higher permission level authorizing the one or more sensors to generate usage data for a greater amount of time, the account status component determines an account status comprising a lower amount owed for the display device, a lower monetary price for an available replacement display device, or an increased access level for content or services available on the display device, respectively;

gathering usage data from the one or more sensors the display device by activating or deactivating the one or more sensors based on the permission level; and transmitting the usage data to a remote server.

13. The method of claim 12, further comprising detecting one or more viewers based on the usage data.

14. The method of claim 13, further comprising determining an identity of at least one of the one or more viewers.

15. The method of claim 14, further comprising associating at least a portion of the sensor data and display device usage with the identity.

16. The method of claim 14, further comprising associating at least one of the permission level and the account status with the identity.

17. The method of claim 14, further comprising determining whether the identity corresponds to a restricted identity and limiting association of the sensor data and display device usage with the identity in response to determining that the identity corresponds to the restricted identity.

18. The method of claim 12, further comprising indicating to one or more individuals in a viewing area of the display device that the data gathering component is currently gathering data about activity in the physical region near the display device.

19. The method of claim 12, further comprising:
receiving input from the user changing the permission level to increase or decrease the amount of data or type of data that can be gathered; and
determining an updated account status based on the permission level change.

20. The method of claim 19, further comprising providing an indication on the display device of the updated account status.

21. A system comprising:
one or more sensors configured to sense activity in a physical region near a display device and generate usage data for the display device;
a permission management component configured to receive an updated permission level corresponding to an account associated with the display device, wherein the permission level indicates an amount of time that the one or more sensors are authorized to generate usage data within a time interval;
a usage component configured to receive usage data of the display device from the one or more sensors according to the permission level;
an account management component configured to determine a new status for the account based on the updated permission level, the account status comprising one or more of an amount owed for the display device, a monetary price for an available replacement display device, and an access level for content or services available on the display device, wherein, in response to the permission management component indicating a higher permission level authorizing a greater amount of time for the one or more sensors to generate usage data, the account management component determines a new account status comprising a lower amount owed for the display device, a lower monetary price for an available replacement display device, or an increased access level for content or services available on the display device, respectively; and
a data gathering component configured to gather usage data for the display device by activating or deactivating the one or more sensors based on the permission level.

22. The system of claim 21, wherein the permission management component is further configured to determine the permission level based on an agreement accepted in relation to the account.

23. The system of claim 21, wherein the permission level indicates a number of hours of usage data to be gathered during a time interval.

24. The system of claim 21, wherein the permission level indicates a cumulative number of hours of usage data to be gathered.

25. The system of claim 21, wherein the permission level indicates that the usage data is only collected during usage of the display device.

26. The system of claim 21, further comprising a data management
component configured to one or more of:
anonymize the usage data to remove personally identifying information; and aggregate the usage data with usage data from one or more other accounts.

27. The system of claim 21, wherein the account management component is further configured to determine the account status based on an amount of received usage data.

28. The system of claim 21, wherein the account status comprises an access level for content or services and wherein the access level indicates a ratio of an amount of time available for the content or services to an amount of usage data received.

29. The system of claim 21, wherein the account status comprises the amount owed for the display device, and wherein the account management component reduces the amount owed for the display device based on one or more of:
an amount of time for which usage data has been received by the usage component; and
a length of time during which the permission level has been set to at least a specific permission level.

30. The system of claim 29, wherein the account management component reduces the amount owed to zero.

31. The system of claim 21, wherein the account status comprises the monetary price for the available replacement display device, and wherein the account management component reduces the monetary price for the available replacement display device based on one or more of:
an amount of time for which usage data has been received by the usage component; and
a length of time during which the permission level has been at least a specific permission level.

32. The system of claim 21, wherein the account management component comprises an access level that indicates availability of content from a provider of the display device and content from other content providers, wherein the access level indicates that content from the other content providers is more expensive than content from the provider of the display device.

33. A method comprising:

receiving from a viewer of a display device a permission level indicating permission for gathering one or more of an amount of data and a type of data with respect to a display device, wherein the display device linked with an account;

receiving usage data from the one or more sensors by activating or deactivating one or more sensors in a physical region near the display device in accordance with the permission level;

changing an account status for the account based on the received permission level, the account status comprising one or more of an amount owed for the display device, a monetary price for an available replacement display device, and an access level for content or services available on the display device; and disabling one or more features of the display device in response to determining that at least one of the one or more sensors is blocked, disabled, or incorrectly positioned.

34. The method of claim 33, wherein the account status comprises the access level for content or services available on the display device, and wherein the access level is based on the permission level.

35. The method of claim 33, wherein the data about the activity in the region near the display device comprises location data corresponding to a location of the display device.

36. The method of claim 33, wherein the usage data comprises data indicating content displayed on the display device.

37. The method of claim 33, wherein disabling one or more features of the display device comprises rendering the display device inoperable.

\* \* \* \* \*